July 24, 1956
J. A. VICTOREEN
2,756,346
POCKET IONIZATION CHAMBER
Filed Oct. 6, 1950
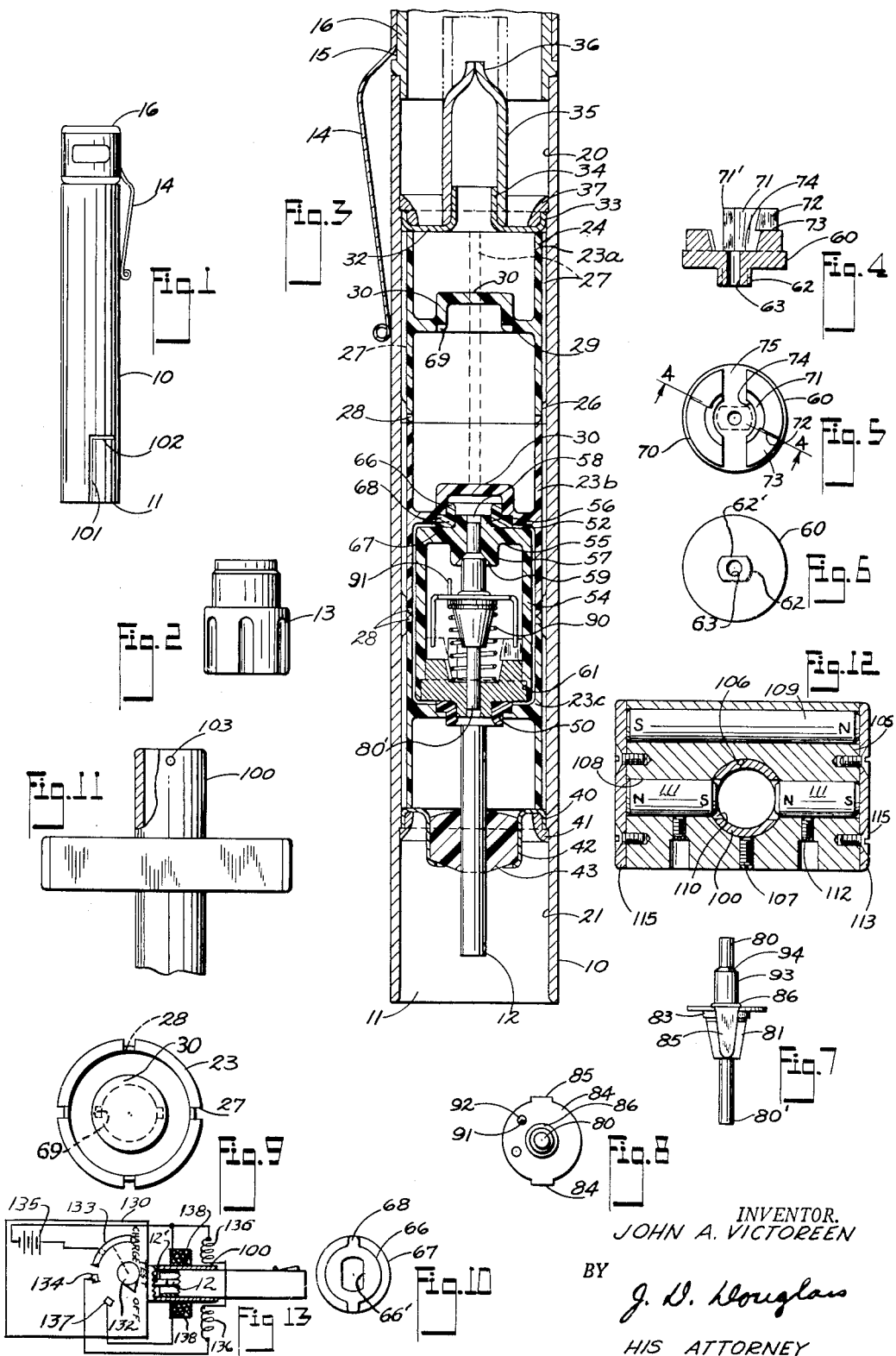
INVENTOR.
JOHN A. VICTOREEN
BY
J. D. Douglas
HIS ATTORNEY

United States Patent Office 2,756,346
Patented July 24, 1956

2,756,346

POCKET IONIZATION CHAMBER

John A. Victoreen, Cleveland, Ohio, assignor to The Victoreen Instrument Company, Cleveland, Ohio Application October 6, 1950, Serial No. 188,819

13 Claims. (Cl. 250—83.3)

This invention relates to improvements in instruments for the measurement of radiant energy and more particularly to improvements in ionization chambers which may be of the so-called pocket type.

As is well known to those versed in the art, an ionization chamber usually comprises a pair of electrodes which may be charged to a predetermined potential. After charging the electrodes, the device is subjected to radiation, which ionizes the gas between the electrodes, allowing current to flow, and thus decrease the potential difference between the electrodes. It is preferable that such instruments be so constructed that they may be calibrated in Roentgen units.

Preferably, such a device may be made in the form of an elongated tube of relatively small diameter which may be conveniently carried on the person the same as a pen or pencil. The unit is charged by a charger-reader. The charger reader enables the electrodes to be charged to a predetermined potential difference and also enables the residual charge, after being subjected to radiation, to be read with great accuracy.

Among the parameters which enter into the design of such a chamber, and particularly those which permit accurate calibration are: the volume of the chamber; the pressure of the gas in the chamber; the wave length dependents of the chamber; and the spacing between the electrodes. It is highly desirable that such a chamber may be hermetically sealed. If it can be sealed, the pressure of the gas can be maintained constant and moisture can be excluded. If the electrodes can be placed closer together, the electrostatic capacity can be arranged to provide a desirable volt-sensitivity to the measuring system.

By my present invention, I am able to provide an ionization chamber wherein the range of a portable device is materially extended so that considerably larger quantities of radiation can be accurately measured and recorded than was heretofore possible. The device is so constructed that it is not subject to atmospheric changes in humidity, temperature or pressure and eliminates the resultant inaccuracies due to such variables.

By my improved construction, I am able to provide a device that is hermetically sealed and wherein connection of the electrodes to the charger-reader can be made by a charging switch that is operated by an exterior magnetic field and avoids the need of conductors extending through insulation materials which would be exposed and subject to leakage. This construction also allows the device to be operated at pressures differing from atmosphere, which pressure can be maintained constant since leakage is eliminated.

The construction is such that the insulation between the electrodes is reduced to a minimum. Difficulties were previously experienced with insulation materials because they were subject to ionization and were therefore poor insulators. Ionization of the insulation made it a poor insulator, with the result that the chamber would not hold a charge. The recovery time of the devices after they had been subjected to intense radiation until the insulation became deionized and again a good insulator was greatly extended.

The improved switch construction of my invention is such that it cannot accidentally be operated and cause a loss of charge on the electrodes because the operation depends upon a coordinated compound movement of the switch in a magnetic field of a predetermined form. Furthermore, by placing the switch in the chamber itself, and in one of the electrodes, the space occupied by it is not subject to ionization. The capacity of the switch system when connected to the charging apparatus is very low and does not appreciably upset the entire system by the adding of its capacity thereto when it is connected to the system.

Still other advantages of the invention, and the invention itself, will become more apparent from the following description of an embodiment thereof, which embodiment is illustrated by the accompanying drawings and described in the following specification.

In the drawings:

Fig. 1 is an outside elevational view of a pocket chamber designed according to and embodying my invention;

Fig. 2 is a view of a cap for closing the end of the chamber;

Fig. 3 is a vertical medial sectional view of the chamber, several times enlarged;

Fig. 4 is a vertical medial section through the magnetic switch control block;

Fig. 5 is a top plan view thereof;

Fig. 6 is a bottom plan view thereof;

Fig. 7 is an elevational view of the movable switch element;

Fig. 8 is a top plan view thereof;

Fig. 9 is a bottom plan view of one chamber forming elements;

Fig. 10 is a plan view of one of the insulators used;

Fig. 11 is a plan view showing a fragment of a charger-reader socket and the magnetic operator carried thereby;

Fig. 12 is a sectional view through the magnetic operator; and

Fig. 13 is a schematic view of an electrically controlled switch operator.

Referring now to the drawings, throughout which like parts have been designated by like reference characters, and particularly to Fig. 1, it will be seen that in its preferred form the chamber takes the shape of a small cylindrical casing 10 approximately one half an inch in diameter and 3¼ inches long. It has an open end 11 through which access is obtained to a connector or contact rod 12. This end is normally closed by a friction plug or cap 13 shown in Fig. 2. A pen type clip 14 is provided being seated in a groove 15 provided in the upper plug 16 on the one end, whereby the same may readily be clipped in a pocket or to the clothing of the wearer.

The outer casing 10 is preferably formed of aluminum tubing, the tubing being counterbored at 20 and 21 on each end to facilitate assembly. Interiorly of the casing and disposed in end to end relation are a plurality of plastic sleeves which, among other things, form the outer electrode. These sleeves may, except for slight modification of one which will hereinafter be discussed, be substantially identical and may be constructed of nylon or other suitable material. As can best be seen by reference to Figs. 3 and 9, each sleeve comprises a cylindrical outer wall 23a, 23b, and 23c which provides a close fit with the interior of the casing 10. One end 24 of the sleeve may be a plain squared off end, while the other tapers with an S curve 26 to the inner wall of the sleeve.

The periphery of the sleeve is provided with one or more longitudinally extending grooves 27, of which in this instance four diametrically opposed grooves are shown. It will be obvious as the description proceeds that the grooves may vary in number, the main purpose being to provide passageways for pumping the unit. The grooves extend to notches 28, which notches extend transversely across the ends of the sleeve providing passageways to the interior of the sleeves. It will be appreciated that in place of the notches, holes could be provided from the grooves to the interior of the sleeves.

Midway between the ends of the sleeve, there is provided a partition 29 which is formed with a cup shaped center part 30. This part provides a socket for supporting the other parts as can best be seen in connection with two lower sleeves of the figure. The socket in the upper sleeve is in this case unused.

By this construction, it will be seen that casings 10 of different length could be used should it be desired, since more or less of the sleeves could be used.

In this particular instance, three of the sleeves are used. The upper sleeve serves as a spacer only, and the two lower sleeves hold the other parts that form the ionization chamber proper, as well as functioning as a part of the chamber. The three sleeves with their other parts, hereinafter to be described are slid into the chamber and are held in place at the upper end by a stop of eyelet formation which may be of metal such as aluminum, brass or other metal. It is formed to provide a cupped part 32, the outer wall or flange 33 of which engages the interior of the casing just below the shoulder formed by the counterbore 20. The stop is soldered in place by applying solder 37 to the interior and the edge of the flange and to the wall and shoulder of the counterbore. If desired, the wall of the casing 10 may be provided with one or more longitudinally aligned dimples at spaced intervals, not shown, which would provide small bosses on the interior for engagement in the grooves 27 to assure the proper alignment of them with each other.

The center of the stop is formed with a tubular portion 34 upon which the seal-off tube 35 is secured. The seal-off tube may be of copper or lead. Through it, the device is degassed, filled with the type of ionizable gas desired at the desired pressure and then sealed by pinching or soldering as indicated at 36. After seal-off, the end of the casing may be closed by the plug 16 which is pressed into the bore 20 and secured therein in a suitable manner as by cement, staking or upsetting the material.

The other end of the assembly is held in place in a like manner. In this case, the seal comprises a cup which may be of an iron-nickel alloy such as "Kovar." It includes the outer flange 40 and is secured in place by solder 41 in the manner previously described. The cup is provided with a center flange 42 in which a bead 43 of glass is sealed. The bead in turn carries the "Kovar" rod 12 which is the contact pin for the device.

The sleeves, as stated, are the same, except that the lowermost one has the cup removed to provide a center opening 50. This opening and the cup 30 on the adjacent sleeve, provide means whereby the remaining parts of the ionization chamber and the magnetic switch are supported.

All surfaces of the sleeves 23 are treated by coating them with a material of a suitable atomic number, such as carbon, to cause them to be conductive. This also causes them to be electrically connected to the casing 10.

As can be best seen in Fig. 3, the sleeves 23b and 23c in their abutting relationship, cooperate to form a chamber 52 having the centrally disposed cup 30 at one end and the opening 50 at the lower end, the cup and opening being in alignment with each other and coaxial with the inner wall. The inner wall of this chamber constitutes the outer electrode of the ionization chamber.

The cup and opening provide the means whereby the central electrode may be supported in exact coaxial alignment with the outer electrode. It provides such a high degree of accurate support that the spacing between the two electrodes may be made very small to provide an unusually high capacity for such a device. The ratio of the diameter of the internal electrode to the external electrode, because of the close spacing, is on the order of .9. The closer it can be brought to 1, the higher the capacity would be. The spacing between the inner and outer electrodes is preferably the same throughout all parts of the chamber.

The inner electrode is hollow and houses a switch which is magnetically operable to enable it to connect this electrode to the connector rod 12.

It comprises a plastic sleeve body 54, such as nylon, of cylindrical formation, the upper end of which is provided with a wall 55 that carries a short outer boss 56 and an inner boss 57 in coaxial alignment with each other and with the body 54. It is provided with a bore 58 which extends through the bosses, the bore merging with an outwardly slanting seat 59 on the inner side of the inner boss. This bore provides a support for one end of the switch member hereinafter described.

The lower end of the body is provided with a plug or vane stop, which supports the lower end of the body. It provides a bearing for the magnetic switch vane and also cooperates with parts of the vane to prevent accidental operation of the switch as well as an interlock that enables the switch vane to be operated only upon the performing of certain movements of a magnetic field for orienting the vane in proper relation to the stop.

The stop, Figs. 4, 5 and 6, comprises a body portion 60 of disc shape which is adapted to be inserted by a press fit into a counterbore 61 in the lower end of the body 54. The lower end of the body is provided with a coaxial boss 62, that has a central bore 63. The bores 58 in the bosses 56—57 and the bore 63 in the boss 62, being in axial alignment, provide bearing means for supporting the magnetic switch vane.

The inner electrode assembly is supported in the cup 30 and the opening 50 by bushings of a material which has a minimum of out-gassing and is a good dielectric. Polyethylene or poly-tetrafluoroethylene are suitable substances from which they can be made. The bushings, Fig. 10, are each the same as the other and comprise a sleeve-like body 66 having a peripheral flange 67 at one end. The sleeve portions are adapted to be seated over the bosses 56 and 62 and support the electrode assembly, the peripheries of the sleeves being engaged in the cup 30 and the center opening 50. The flanges 67 provide the fixed end spacing of the assembly from the wall forming the outer electrode. The bushings are provided with diametrically opposed bosses 68 on the side of the flange adjacent the body which bosses engage in notches 69 at the edge of the cup 30 and opening 50 to provide a key to properly locate the same. The inner bore of the bushings is provided with diametrically opposed flat sides 66' which engage with the flat sides on the boss 56 and at the lower end with the flat sides 62' of the boss 62. All surfaces of the assembly are preferably coated with carbon to provide a good conductive surface. In this event, the sole means for insulating the inner electrode from the outer electrode comprises the bushings 66—67.

The stop 60 is provided with a pair of vane control elements previously mentioned as vane interlock members. These elements, which may be integral with the base, are in the form of upstanding bosses having a curved outer surface 70 which provides a close sliding fit with the inner wall of the body 54. The inner face 71 of each boss slants inward toward its point of connection with the base. Each boss is cut away at 72 to provide a stop 73 disposed above the base at approximately one half the height of the boss. The bosses are diametrically opposed to each other being separated by a space 75 which extends from each opposite edge and merges with an enlarged circular well or center seat 74 at the center of the base.

The vane Figs. 7 and 8 includes a shaft portion and a vane proper. The shaft is preferably made of aluminum or other non-magnetic material and includes opposite end portions 80 and 80' of reduced diameter adapted to have a sliding fit in the bores 58 and 63. A body 81 which is an inverted frustrum of a cone is provided spaced from the end 80' the upper base end of which is provided with a cylindrical portion 83. Above this the body is of reduced diameter to provide a shouldered portion. The shoulder supports a vane which comprises a circular body portion 84 having a center hole which slips over the shoulder 83 after which the shoulder is upset or staked at 86 to hold the body securely in position on the part 83. Legs 85 depend from the body on diametrically opposite sides.

The body part is made of a material which may be magnetically attracted. Thus the vane may be rotated by an external magnetic field or the whole vane assembly may be moved longitudinally.

The construction is such that the entire mechanism may be assembled in the casing and held in place by the end seals. In this connection, the top end seal may be soldered in position. Next, the sleeve 23a is slid into position followed by the sleeves 23b and 23c, the center electrode and switch assembly having been first assembled between the two sleeves 23b and 23c. Then the bottom seal is placed in position after which it is soldered and the assembly is then ready for the final operation of degassing, etc.

Although three of the sleeves are shown, two of which are exactly alike, it is contemplated that the extra top sleeve, which merely serves as a spacer, may be omitted. In this event, sleeves 23b and 23c only would be used. It is also contemplated that these sleeves as well as the center electrode could be made longer if desired and two sleeves used to fill the entire chamber.

As previously stated, the vane assembly is mounted inside of the center electrode, the ends 80 and 80' being journalled in the bores 58 of the center electrode boss and the member 60 respectively. The vane may thus rotate, as well as move longitudinally. Spring means is provided to hold the vane in the uppermost position as shown and to keep it rotated in a spring pressed position so that it cannot accidentally contact the pin 12. This spring is helical and of light construction, being sufficiently heavy to resist movement of the vane and at the same time sufficiently light that, when the magnetic forces are properly applied, the vane may be easily moved.

The spring 90 has one end seated on the seat 74 in the center of the member 60. Being disposed about the vane shaft the other end engages the under side of the vane and urges the same upward.

The upper end of the spring is provided with an upwardly bent end 91 which may extend through a hole 92 in the vane. Two holes 92 and 92' are provided so that the correct tension may be selected, the end of the spring being inserted in either hole. The bottom end of the spring is provided with a tangential extension which engages against the side of one of the members 70 in the groove 75. The spring is sufficiently compressed during assembly to urge the vane upward so that the enlarged portion 93 on the shaft 80, which is provided with a seat 94, seats on the seat 59. At the same time, the spring is placed under a slight tortional or winding stress so that it is tending to rotate the vane in a clockwise direction. As can best be seen in Fig. 3, the face 72 of the member 60 interferes with this movement because the arm 85 of the vane is long enough so that it extends below the top of the member but is spaced above the shoulder 73. The vane being very light, the tortional efforts needed by the spring is very small. Since the vane arm 85 is above the shoulder 73, endwise jars or shocks merely move the vane downward until the ends of the arms engage the shoulders 73 and further downward movement is prevented.

The surfaces of the assembly being carbon coated, electrical contact is always maintained between the vane and the remainder of the assembly. The vane being reciprocable in the metal member 60 makes electrical contact therewith, which contact is further supplemented by the spring 90 which engages the vane and the member 60. The vane is adapted to be moved so that the end extends through the member 60 into contact with the rod 12. This operation is effected by the magnetic attraction of opposite magnetic fields which are disposed outside of the casing at points diametrically opposite the vane arms 85. If these fields are sufficiently concentrated in a small area, the attraction of the vane toward the poles in the field is sufficient that when the casing is rotated, the vane stands substantially still and tries to remain in alignment with the field.

Thus the instrument is first placed in the field, and is then rotated clockwise. The casing being moved or rotated clockwise, the face 72 is moved away from the edge of the arm 85; the spring 90 being sufficiently light to permit this "winding up" movement of the spring. The movement of the casing is continued until the arm 85 of the vane is opposite to the groove 75. Further movement is limited because the arm 85 will engage the upright wall 71' of the opposite boss 73. There is now nothing except the spring to keep the vane from moving downward. If the casing is then moved relative to the field so that the field moves downward with respect to the vane, the attractions of the field endwise for the vane will cause it to be moved down until the part 80' engages the contact bar 12.

A preferred and similar form of operation is to move the open end of the unit into the field so that the vane is first moved until the arm 85 engages the face 73 on the element 60. In this position, the vane has moved longitudinally as far as it can go but would move still further if its progress was not impeded. If, then, the casing is rotated in the proper direction, the vane arm will slide off the face 73 and snap downward into the groove 74 and the shaft end striking the connector pin 12.

It will be seen from the above that a compound and synchronized movement in a magnetic field of predetermined formation must be used to effect the closing of the switch, and that the possibility of accidental operation is extremely remote.

As is well known to those versed in the art, this type of device is charged so that the inner and outer electrodes have a difference in potential. This is usually effected by an instrument which not only charges the chamber but enables the state of the charge to be indicated by measuring the potential of the system at any time the instrument is properly inserted in the charger-reader. One such device is now well known on the market as a "minometer."

The charging or reading process is effected by removing the cap 13. After this, the instrument is inserted into a socket indicated at 100 of Fig. 11 which is provided on the charger-reader. The entire instrument is not shown because it can assume many forms. Suffice to say that, when the chamber is finally in place in the socket, the contact rod 12 is connected to the charger reader. It is preferred that this part of the chamber be inserted and connected first and prior to the operation of the switch in order that the contact rod may be brought to the desired potential prior to operation of the switch to reduce the error that would occur if the switch was to connect the center electrode to a contact rod of indeterminate potential, and to observe for any spurious leakages previously discussed.

Several forms of magnetic field may be supplied, the magnetic force being obtained from either permanent or electromagnets. One form of permanent magnet switch operator is illustrated in Figs. 11 and 12. In this instance, the chamber, adjacent the open end, is provided with an L-shaped slot or groove which comprises a part 101 extending longitudinally of the casing wall and part 102 at right angles. This slot is adapted to engage a pin 103 extending into the interior of the socket. This permits the chamber to be shoved into the socket for the length of the longitudinal portion and then rotated the length of the part 102.

Supported on the socket is the magnetic operator assembly. It may comprise a rectangular block of non-magnetic material 105 having a center hole 106 which enables the same to be slid over the socket and secured in position by a set screw 107. At the upper end, the block is provided with a bore in which is disposed a bar type permanent magnet 109 polarized as shown. Opposite to the socket the block is provided with a second bore 108 which intersects the bore 106. Preferably, the socket is provided with apertures 110, and short permanent bar magnets 111 are disposed in bores 108. The magnets are polarized as shown and are held in position by set screws 112. Magnetically permeable plates 113 are secured to the end of the block 105 by screws 115. Thus a strong magnetic field is supplied with the air gap and the concentrated flux extending across the socket.

It will be appreciated that different types of flux producing devices may be used.

Since the exposed contact rod is not connected to the inner electrode, it is possible to test for possible leakages of this contact before conditioning the instrument for reading the residual change. First, the device can be inspected to see if any foreign substance is present. If there is a foreign substance present, it can be removed. Next, the instrument can be placed in the charger-reader to provide a connection to the rod only and the charge placed on the rod without the inner electrode system being connected, and the stability of the charge observed. If the potential which is read should decrease, within a short space of time, then it will be known that some leakage is present. The device may then be removed and thoroughly cleaned. When after insertion and charging, the reading remains stable, then the final movement is made that causes the switch to operate and connect the center electrode system.

Thus, if it should appear that a critical measurement is to be observed, the possibility of losing that reading may be guarded against.

In addition to the above, since the switch is operable in the manner set forth, the device cannot accidentally become discharged and even prevents discharge should someone deliberately attempt to short the contact rod.

As has been described, the construction is such that the pressure of the gas in the chamber may be maintained constant or at a predetermined pressure. This enables the instrument to be operated at places under varying conditions of pressure and humidity and permits the device to be accurately calibrated in Roentgens. Because it is moisture proof, it is not subject to variations, no matter how many times the cap is removed or what the humidity.

Being hermetically sealed, it enables a choice of gas and pressure to be used and particularly permits of the use of a rarified gas of low atomic number other than air, such as hydrogen or helium, or a mixture of such gases. By using the low atomic number gas, the full scale reading in Roentgens may be increased, because the ionization produced is roughly proportional to the number of electrons per molecule of gas used. It is also contemplated that nitrogen, oxygen and neon may be used, these gases constituting a class of gases of sufficiently low atomic number to be useful as an ionizing medium.

It has also been described how the insulation has been concentrated at the minimum number of places and still afford a good support for the inner electrode. Reducing the volume of insulation causes a large reduction of the ionization of the insulation which leads to spurious leakages. The equal spacing of the center electrode from the outer electrode results in an equalization of the field intensity throughout all the device except for that small space taken by insulator, which, by its construction exposes only a thin annular edge to the ionization chamber volume. The size of the connector is such that it has relatively small additive capacity effects when connected into the charging circuit, and, of course, this is taken into consideration in the calibration of the charger reader. The movable switch contact provides negligible added capacity to the circuit when it is operated. Preferably, it is so arranged that in its retracted position, the spacing between the ends and the electrodes is substantially the same as the spacing between the electrodes.

The walls that form the chamber being made of nylon and coated with a thin conductive layer of carbon to provide a chamber wall having an effective atomic number which produces an output varying with wave length in the same manner as a primary standard air chamber. The chamber being hermetically sealed enables a gas of a low atomic number, such as hydrogen, helium or a mixture thereof, and wherein the pressure may be at a predetermined value particularly below atmospheric and maintained over a long period of time without contamination or change in pressure. The use of a gas or mixture of gases of low atomic number reduces the gas multiplication and permits the use of a higher pressure and still provides a low output, resulting in an increase in the range of the device. The voltage applied to the electrodes must be below that required to prevent excessive gas multiplication.

As previously stated, electro-magnetic means may be used to operate the magnetic switch as well as the permanent magnet means. In this respect, I have shown diagrammatically in Fig. 13 a form of electro magnetic operation. In this case, the box or casing 130 which houses the charger reader is shown having the socket 100 projecting from the end. The ionization chamber is inserted in the socket and rotated so that the slot 101—102 engages with the pin 103 and holds the chamber in place in the usual manner with the contactor rod 12 in engagement with the connector rod 12' of the charger reader. In this case, the insertion of the chamber in position has no effect upon the magnetic switch.

When the switch of the charger reader is operated the knob 132 rotates the slide 133 into the contact with the contact 134 which connects the battery 135 to the two vane orienting coils 136. These coils are so positioned that when energized, their flux causes the rotation of the vane so that the legs 85 are opposite the channel 75 of the stop 60. The knob is then in the test position. If desired, this knob can exercise a dual control such that in the test position, the charge is first applied to the control rod and the condition of the insulation determined by observing the state of the charge.

When it is desired to charge the chamber, the knob is rotated to the charge position. At this time, the slide 133 also contacts the contact 137. This supplies current to the coil 138 which causes the vane to be pulled down into contact with the rod 12.

The charge then may be applied to the system by a separate control or, as stated, the single control can also cause the application of the charge as well as operator of the switch. For some purposes, having separate controls provide a more versatile instrument. Other than the fact that the fields are supplied by an electric current, however, the operation is the same as that previously described.

Having thus described my invention, I am aware that numerous and extensive departures may be made therefrom without departing from the spirit or scope thereof.

I claim:

1. An ionization chamber comprising a cylindrical aluminum tube, a first electrode for said ionization chamber comprising two or more thin walled cylindrical sleeves of nylon disposed in the tube and having all their surfaces coated with carbon, each of said sleeves having centrally disposed wall formed to provide a support, a second electrode comprising a cylindrical body having centrally disposed bosses on opposite ends and provided with a coating of carbon, insulating means for supporting said second electrode in the supports on the outer electrode comprising polyethylene bearings disposed in the supports engaging said bosses.

2. An ionization chamber comprising an outer casing, an outer electrode supported by said casing, an inner electrode supported in closely spaced concentric relation to the outer electrode and formed with a hollow interior, switch means normally disposed in the interior of said inner electrode, said casing being hermetically sealed and an insulating contact rod carried at one end, said switch adapted to make electrical connection to the contact rod.

3. An ionization chamber comprising a cylindrical metal wall, an outer electrode supported internally of said metal wall and electrically connected thereto, a hollow inner electrode and insulating means for supporting said electrode in equally spaced relation to the outer electrode, sealing means for hermetically sealing the casing and a connector carried by an insulating bead disposed at one end of said casing and extending opposite the end of said inner electrode, switch means disposed in said inner electrode adapted to be moved to connect the inner electrode to said contact rod.

4. An ionization chamber comprising a cylindrical metal wall, an outer electrode supported internally of said metal wall and electrically connected thereto, a hollow inner electrode and insulating means for supporting said electrode in equally spaced relation to the inner electrode, sealing means for hermetically sealing the casing and a connector carried by an insulating bead disposed at one end of said casing and extending opposite the end of said inner electrode, switch means disposed in said inner electrode adapted to be moved to connect the inner electrode to said contact rod, and means for preventing accidental movements of said switch means into contact with said rod comprising a stop member having abutments for engagement with said switch and resilient means for holding said switch in operative relation to said abutments.

5. An ionization chamber comprising a cylindrical outer casing, an outer electrode supported by said casing and comprised of nylon sleeves having thin cylindrical walls with a coating of conducting carbon on all surfaces, said sleeves being formed with end walls having centrally disposed sockets therein, a center electrode comprising a cylinder of nylon having a thin wall coated with conductive carbon and provided with bosses for engagement in said sockets, insulating bushings interposed between said bosses and said sockets for supporting said center electrode in spaced relation to the outer electrode, a magnetically operable switch member including a shaft slidably journalled in said bosses and disposed inside said center electrode, resilient means to retain said switch in a retracted position in said center electrode, said switch means including a vane of magnetically attractive material and having arms extending from opposite sides of said shaft, stop means disposed in one end of said center electrode and including abutments for engagement with the sides of said vanes to limit the rotational movement due to said resilient means, abutments disposed opposite said vanes to limit movement of the switch in a longitudinal direction, said stop means being formed to provide channels for reception of said vane arms when the vane is moved from over the abutments, and means for supplying a magnetic field disposed to one side of the vanes for rotating the vanes, when the field is energized, to a position over said channels and disposed beyond the ends of the arms to suck the arms downward into said channels, said casing being provided with a contact rod hermetically carried by an insulating bead and having a portion extending toward said switch shaft and another part toward the end of said casing, the part toward the switch shaft adapted to be contacted thereby upon the application of said composite magnetic field.

6. An ionization chamber comprising a thin walled cylindrical aluminum casing providing a support for an outer electrode formed of sleeves of nonionizable plastic material having a coating of electrically conducting material on all surfaces, said sleeves being formed with at least one groove on the periphery extending longitudinally of the sleeves adjacent the casing wall and each having a transversely extending wall portion formed with central sockets, means for holding said sleeves in position and hermetically sealing said casing comprising a metallic member having a flange for soldering to the inner wall of the casing and a wall engaging the end of one of said sleeves, a second member for the end of the other sleeve including a flange for soldering to the inner wall of the casing and a wall portion for engaging the sleeve and a central cylindrical portion having welded thereto glass bushing, a contact rod carried by said glass bushing in insulated condition from the wall and having a portion extending inward toward the sleeve and another part extending outward toward the open end of the casing, a center electrode for said chamber comprising a generally cylindrical member of non-ionizable plastic material having one end wall formed with a boss adapted to extend into one of said sockets, said member having an end closed by a metallic stop member provided with a boss for extension into the socket on the other sleeve, insulating bushings interposed between said bosses and said sockets together with the socket walls formed supporting means for supporting said electrode in closely spaced coaxial alignment with the outer electrode and with said outer electrode providing an ionization spaced between the electrode substantially equidistant from each other, said surfaces of said inner electrode being coated with electrically conductive material and the sole means of insulation between said electrodes being said insulating bushing, said bushings and said cooperating supports being such that the insulation is concentrated in a small volume, said bosses being formed with axially aligned bores, and a switch vane including a shaft of non-magnetic material rotatably and reciprocably mounted in said bores, said shaft carrying thereon a magnetic vane including arms extending from the shaft and adjacent to the inner wall of the inner electrode on opposite sides, said metallic stop member being formed to provide a channel into which said arms may extend when the vane is moved longitudinally, and with laterally extending abutment surfaces adjacent the channel for engaging said arms when they are over the abutments to limit longitudinal movement of the arms and shaft, and a second pair of walls spaced from said channel for engagement with the arms to limit the rotating movement of the arms and spring means in engagement with the stop member for urging the vane in an upward direction and holding the vane arms against said last pair of walls and over said abutment surfaces in the absence of a properly applied magnetic field and means to move said vane against the tortional and longitudinal stress of said spring to rotate the vane arms over said channels and move the vane arm down into said channel with the vane shaft into connection with said contact rod comprising a means to establish a magnetic field on opposite sides exteriorly of said casing and to one side of the normal position of said vanes and longitudinally displaced from said vanes.

7. An ionization chamber comprising a thin walled casing providing a support for an outer electrode formed of sleeves of nonionizable material having a coating of conducting material, said sleeves being formed with a wall portion having a socket, means for holding said sleeves in position comprising a metallic member engaging the end of one of said sleeves, a second member for engaging the end of the other sleeve including a central portion having glass bushing and a contact rod carried thereby, a center electrode for said chamber comprising a generally cylindrical member of non-ionizable plastic material having one end wall formed with a boss adapted to extend into one of said sockets, said member having an end closed by a metallic stop member provided with a boss for extension into the socket on the other sleeve, insulating bushings supporting said electrode in closely spaced coaxial alignment with the outer electrode, said surfaces of said inner electrode being coated with electrically conductive material and the sole means of insulation between said electrode being said insulation bushing, said bushings and said cooperating supports being such that the insulation is concentrated in a small volume, said bosses being formed with axially aligned bores, and a switch vane including a shaft of non-magnetic material rotatably and reciprocably mounted in said bores, said shaft carrying thereon a magnetic vane including arms extending from the shaft and adjacent to the inner wall of the inner electrode, said metallic stop member being formed to provide a channel into which said arms may extend when the vane is moved longitudinally, and with laterally extending abutment surfaces adjacent the channel for engaging said arms when they are over the abutments to limit longitudinal movement of the arms and shaft, and a second pair of walls spaced from said channel for engagement with the arms to limit the rotating movement of the arms, spring means in engagement with the stop member for urging the vane in an upward direction and holding the vane arms against said last pair of walls and over said abutment surfaces in the absence of a properly applied magnetic field and means to move said vane against the tortional and longitudinal stress of said spring to rotate the vane arms over said channels and move the vane arm down into said channel with the vane shaft into connection with said contact rod comprising a means to establish a magnetic field on opposite sides exteriorly of said casing and to one side of the normal position of said vanes and longitudinally displaced from said vanes.

8. An ionization chamber comprising a casing providing a support for an outer electrode formed of sleeves of nonionizable material having a coating of conducting material, said sleeves being formed with a transversely extending wall portion having a central socket, means for holding said sleeves in position comprising a metallic member engaging the end of one of said sleeves, a second member for the end of the other sleeve including a central portion having glass bushing and a contact rod carried thereby, a center electrode for said chamber comprising a generally cylindrical member of non-ionizable plastic material having one end wall formed with a boss adapted to extend into one of said sockets, said member having an end closed by a metallic stop member provided with a boss for extension into the socket on the other sleeve, insulating bushings interposed between said bosses and said sockets together with the socket walls forming supporting means for supporting said electrode in closely spaced coaxial alignment with the outer electrode and with said outer electrode providing an ionization spaced between the electrode substantially equidistant from each other, said surfaces of said inner electrode being coated with electrically conductive material, said bushings and said cooperating supports being such that the insulation is concentrated in a small volume, said bosses being formed with axially aligned bores, and a switch vane including a shaft of non-magnetic material rotatably and reciprocably mounted in said bores, said shaft carrying thereon a magnetic vane including arms extending from the shaft and adjacent to the inner wall of the inner electrode on opposite sides, said metallic stop member being formed to provide a channel into which said arms may extend when the vane is moved longitudinally, and abutment surfaces adjacent the channel for engaging said arms when they are over the abutments to limit longitudinal movement of the arms and shaft, and a second pair of walls spaced from said channel for engagement with the arms to limit the rotating movement of the arms, spring means in engagement with the stop member for urging the vane in an upward direction and holding the vane arms against said last pair of walls and over said abutment surfaces and means to move said vane against the tortional and longitudinal stress of said spring to rotate the vane arms over said channels and move the vane arm down into said channel with the vane shaft into connection with said contact rod comprising a means to establish a magnetic field on opposite sides exteriorly of said casing and to one side of the normal position of said vanes and longitudinally displaced from said vanes.

9. The combination of an ionization chamber and a charger reader having a socket for receiving the ionization chamber and to make contact therewith for reading and charging the ionization chamber, a magnetically movable switch element in said ionization chamber and magnetic field producing means for said charger reader for actuating said magnetic switch.

10. An ionization chamber consisting of closely spaced coaxial electrodes, a magnetic switch having a movement along the axis thereof and contacting means axially aligned with the magnetic switch.

11. An ionization chamber having a contact electrode and an ionization chamber electrode and a charger reader device arranged to charge the contact electrode in the chamber unit before connection of the ionization chamber electrode, including a magnetic switch to separate and connect the electrode to the ionization chamber.

12. An ionization chamber having a switch therein comprised of a magnetically permeable material, said switch being operable upon the relative movement of a magnetic field longitudinally and rotationally, guide means on said chamber cooperating with guide means on said field producing device to align said chamber and switch in proper relation to the magnetic field.

13. The method of operating a switch for an ionization chamber having inner and outer electrodes, a contact member arranged to be connected to the inner electrode, and switch means in said inner electrode comprised at least partly of magnetic material and interlock means for preventing accidental operation of the switch, which comprises exerting a rotational effort on the switch by an external magnetic field and a longitudinal effect by a magnetic field to cause unlocking and movement of the switch into contact with the contact member.

References Cited in the file of this patent

UNITED STATES PATENTS

| 1,360,235 | McAlpine | Nov. 23, 1920 |
| 1,467,318 | Herdman | Sept. 11, 1923 |
| 2,536,991 | Wollan et al. | Jan. 2, 1951 |
| 2,545,386 | Rich | Mar. 13, 1951 |

OTHER REFERENCES

"Dosimeters and Pocket Chambers," Landsverk, MDDC-395, U. S. Atomic Energy Commission, Dec. 13, 1945, 8 pages.

"Electron and Nuclear Counters," Korff, published by Van Nostrand Co., Inc., New York, N. Y., 1946, pp. 31–33 and 106–108.